United States Patent [19]

Schmidt et al.

[11] Patent Number: 4,933,696
[45] Date of Patent: Jun. 12, 1990

[54] LIGHT IMPERMEABLE TEARABLE COVERING FOR STACK OF SHEET FILMS

[75] Inventors: Manfred Schmidt, Kirchheim; Johann Zanner, Unterhaching, both of Fed. Rep. of Germany

[73] Assignee: AGFA-Gevaert AG, Fed. Rep. of Germany

[21] Appl. No.: 364,609

[22] Filed: Jun. 9, 1989

[30] Foreign Application Priority Data

Jun. 28, 1988 [DE] Fed. Rep. of Germany ....... 3821746

[51] Int. Cl.$^5$ .................. G03C 3/00; G03B 42/02; B65D 65/16
[52] U.S. Cl. .................................... 354/277; 378/182
[58] Field of Search ............... 354/354, 277; 378/174, 378/182

[56] References Cited

U.S. PATENT DOCUMENTS 4,727,391  2/1988  Tajima et al. ................... 354/277

Primary Examiner—Michael L. Gellner
Attorney, Agent, or Firm—Michael J. Striker

[57] ABSTRACT

A light-tight, tearable covering for a stack of sheet films to be inserted into a supply magazine of a sheet film-loading device, with the supply magazine provided with a pulling device for removing the covering after closing the supply magazine, the covering has a flat side, a winding flap engageable by the pulling device, a closure flap releasably held on the flat side, and a flat recess-forming portion provided on the flat side and formed so that the closure flap in a wrapped condition is insertable into the recess-forming portion.

10 Claims, 3 Drawing Sheets

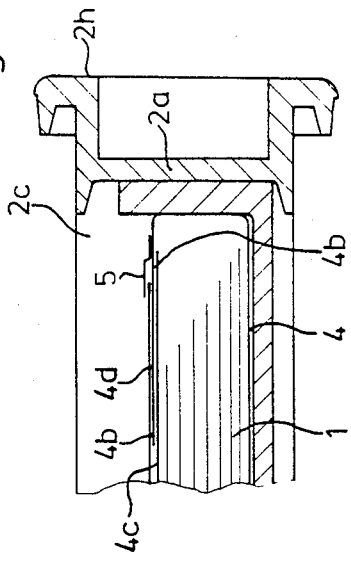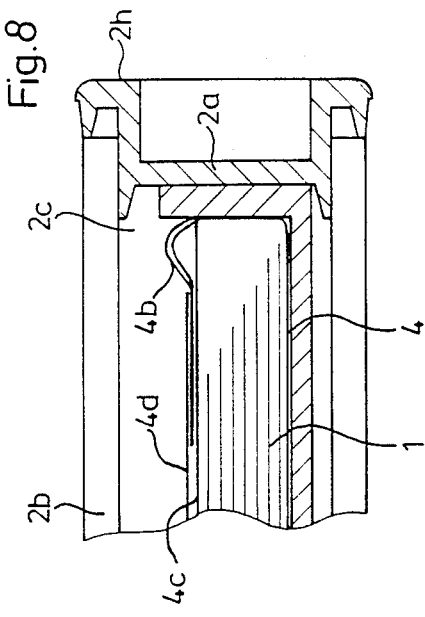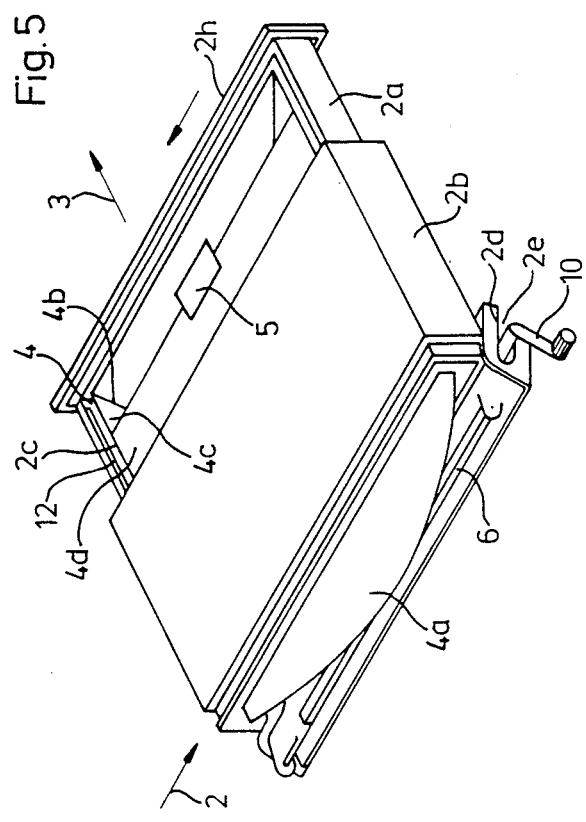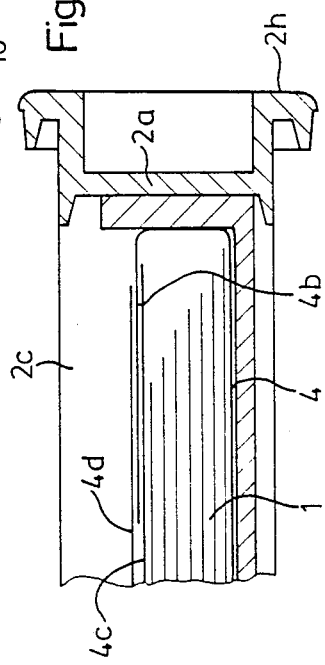

LIGHT IMPERMEABLE TEARABLE COVERING FOR STACK OF SHEET FILMS

BACKGROUND OF THE INVENTION

The present invention to a light-tight tearable covering for a stack of photographic or X-ray sheet films for inserting into a supply magazine of a sheet film cassette-loading device. Such a supply magazine is provided on its side opposite to the tearable covering side with a pulling device, for example a winding device for removing the covering by engaging a winding flap after closing the supply magazine, and a wrapping closure flap of the covering is releasably held on a flat side of the covering.

Sheet film stacks with such coverings are commercially available. The covering must be opened in a dark chamber and the film pack removed from the covering must be inserted in the supply magazine. However, it is now desired to introduce the film pack arranged in the covering during daylight in the supply magazine in a light-tight manner, and after closing the magazine to open the covering and to pull out the film pack.

A supply magazine of this type is disclosed for example in the German document DE-GMS 7,725,804. The tearable flap of the covering is formed by the labyrinth-like mutually folded ends of the flat sides of the covering. Under the action of the pulling which the winding device applies during turning upon the winding flap, the folds must be torn from one another, so that the covering is pulled from the stack during a further turning of the winding device and pulling-on. It has been determined that the forces to be applied on the winding device are not sufficient to tear the tearable flaps from one another in an efficient manner. Therefore, this known arrangement is not suitable for daylight operation, or in other words, for loading the magazine and opening the covering in the closed magazine.

A supply magazine of a similar type is disclosed in the German document DE-PS 3,405,423. The type of the magazine shown here cooperates for opening of the stack covering with the device in which the magazine must be used, and therefore, can be used only in the specially designed device and not universally. In another magazine described here, the conditions are the same as in the magazine in accordance with the German document DE-GM 7725804 with the difference that the folded tearing flaps of the covering must be removed not during winding of the winding flap, but instead by pulling off the winding flap manually. The force for tearing the folded tearing flaps cannot be reached practically.

The German document DE-OS 3,543,024 discloses a supply magazine which has a blade like or saw-like tearable strips for the tearable flaps of the film pack covering after the closing of the magazine. This construction not only requires additional expenses for the supply magazine. It also has the disadvantage that a daylight loading is possible only with specially designed magazine, while the film pack for loading of the different types of known magazines, for example the one disclosed in the German document DE-GMS 7,725,804, cannot be used during daylight.

Finally, the German reference DE-PS 3,612,710 discloses coverings of the above mentioned type in which at least one strong tearable flap which requires high pulling force due to the weight of the stack is removable by hand. They are arranged between or under the holding strips which are brakeable by application of a pulling force to the closure flap or covering. This construction is expensive because of two different adhesive connections, namely differently strong adhesive connections, and their arrangement relative to one another.

SUMMARY OF THE INVENTION

Accordingly, it is an object of the present invention to provide a covering of the above mentioned general type, especially of the last mentioned type, in which easily breakable holding strips are replaced with which are easy to produce in mass production, do not require special arrangement relative to the breakage resistant tearable flaps, release from one another without breakage.

In keeping with these objects and with others which will become apparent hereinafter, one feature of the present invention resides, briefly stated, in a covering in which a flat pocket or loop is arranged on a flat side of the covering, and a wrapping closure flap is insertable in the flat pocket or loop.

In accordance with another feature of the present invention, burdock band parts are arranged on the flat side of the covering and the associated wrapping part of the closure flap and bringable in engagement with one another.

When the covering is designed in accordance with the present invention it eliminates the disadvantages of the prior art and achieves the above mentioned objects.

In accordance with a further feature of the present invention, the closure flap with the pocket or loop or with the flat side of the covering is additionally glued with stable adhesive strip tearable by hand.

A further feature of the present invention is that a further pocket or loop for inserting the winding flap is arranged on the flat surface of the covering which is located opposite to the flat side of the covering serving for holding the closure flap.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a perspective view of a film pack of FIG. 1 during insertion in a supply magazine;

FIG. 6 is a partial section through an open supply magazine with the inserted, not open film pack covering in accordance with the present invention;

FIG. 7 is a view showing a section of FIG. 6 after tearing off of a closure part of the film pack covering;

FIG. 8 is a view showing a section of FIGS. 6 and 7 after closing the supply magazine during removing of the film pack covering.

DESCRIPTION OF THE PREFERRED EMBODIMENTS

Figure 1:
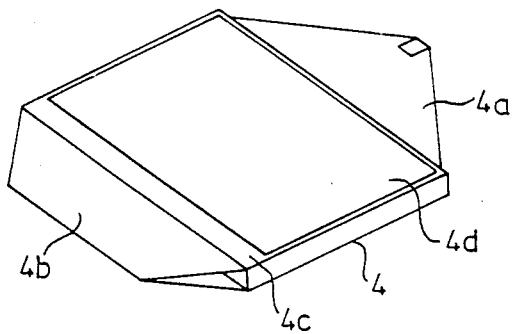
FIGS. 1-4 are perspective views of several positions of an inventive covering with a film pack.
Figure 2:
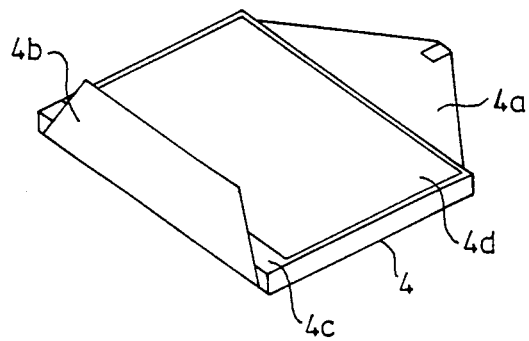
Figure 3:
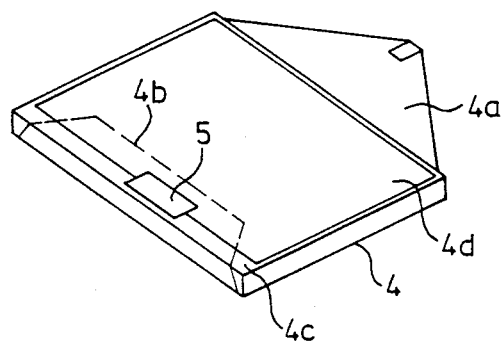

A supply magazine to be used includes a partially upwardly open box 2a and a cover formed as a displacement 2b. The insertion opening 2c of the box 2a near the end side 2h of the box 2a in the insertion direction 3 of the magazine 2 in a cassette loading device. The inlet opening 2c has a side which sufficient only for insertion of a film stack 1 or a film pack into the box 2a and positioning the same, so that in the predisplaced condition of the displacement pipe 2b closeable by the latter in a light-tight manner. The rear magazine end side 2d as considered in the insertion direction 3 can be formed as a gripper part for inserting the magazine 2 into a loading device and for removing from the latter. The rear magazine end side 2b is formed as a swingable-off rear wall which in its swinging-on condition provides a light-tight closing.

In the rear wall or immediately behind it and in the interior of the box 2a, a winding shaft 6 is supported on the side wall. It has mounting means on which a winding flap 4a of a newly inserted covering 4 of a film stack 1 is to be fixed on the winding shaft 6. The winding shaft 6 can be coupled directly or through a gear with a winding crank 10 extending outside the box 2a in a light-tight manner. The winding crank 10 has a swingable, not shown, hinge so that it is turnable in the shown operational position or in a non-use position to a depression 2c of the rear wall 2d. The non-use position must be assumed by insertion of the magazine 2 into a loading device.

For repeated loading of the magazine 2, both the inlet opening 2c and the winding shaft 6 are released by opening of the displacement 2b and by opening the rear wall 2d respectively. Then the covering 4 of the removed film stack which is wound there is pulled off from the winding shaft 6 and a reinforcing and holding cardboard 12 provided under the emptied stack is removed from the box. The reinforcing and holding cardboard 12 has an upstanding abutment on its rear side. The reinforcing and holding cardboard 12 together with the abutment serves for preventing, during pulling-off of the covering 4 from the stack 1 in a closed magazine, a displacement of the stack 1 or its individual sheets as a result of entraining by the covering 4. In accordance with FIGS. 5 and 6, a new film stack 1 together with the covering 4 can be inserted through the inlet opening 2c into the box 2a and the winding flap 4a is fixed to the region of the winding shaft 6. Thereby the rear wall 2d is closed.

Thereby the covering 4 which is located forwardly of the open box 2a is completely closed. For each withdrawl from the stack 1 after closing of the magazine cover 2b by turning of the crank 10 and the winding shaft 6, the closure of the covering 4 is formed in a special manner.

In the upper end-side starting portion, a projecting closure flap 4b is wrapped in the upper covering flat side 4c to form a light protection. As can be seen from FIGS. 1-3 and 5-8, a piece of packing material, for example, covering foil, is glued or welded or the like as a pocket 4d or loop on the flat side 4c with a distance from the side of the covering which faces the side of the closure flap, so as to extend over the remaining flat side 4. When it is formed as a pocket, two further longitudinal sides and the transverse side of the piece, which faces the winding flap, are connected with the flat side 4c. When it is formed as a loop only two longitudinal sides are connected with the flat side.

As can be seen from FIGS. 1-3 and 5-8, the closure flap 4b is folded, so that it obtains a trapezoidal shape. Then it is wrapped into the flat side 4c inserted with its end edge into the pocket 4d or into the loop, until it lies flatly in it. Thereby closure flap 4b is secured against unintentional openings when it is inserted into a magazine 2. In this position the upper surface 4d of the pocket is glued with the outer side of the closure flap by a very tear-resistant adhesive band 5. The tearing strength of the adhesive band 5 is sufficient for securing the covering 4 even during carrying the heavy stack 1 in it, from tearing-off.

This adhesive band 5 after insertion of the stack 1 into the open magazine 2 (compare FIGS. 5 and 6) is torn by hand, as well known. Then the magazine is closed as shown in FIG. 8. When now on the covering 4 by pulling on the winding flap 4a or its winding is slowly pulled, then the closure flap 4b is withdrawn from the pocket 4d for the loop, and unfolded. Thereby the opened covering 4 can be withdrawn from the stack 1 in a known manner.

This construction has the advantage that for producing the pocket 4d no additional material is needed but only the covering 4 itself, and only an additional welding or gluing step is required. Moreover, the removal or opening of the gluing band 5 manually during opening of the covering 4 in the closed magazine is not required again when the easily tearable closure piece is torn off. For pulling the closure flap 4b from the pocket 4d and for unfolding the closure flap 4b, substantially lower forces are required than those used with the known closure parts on the covering 4.

Figure 4:
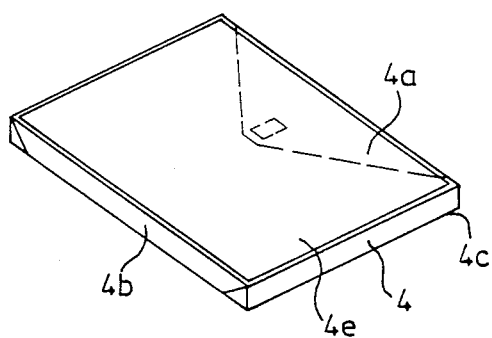
Figure 9:
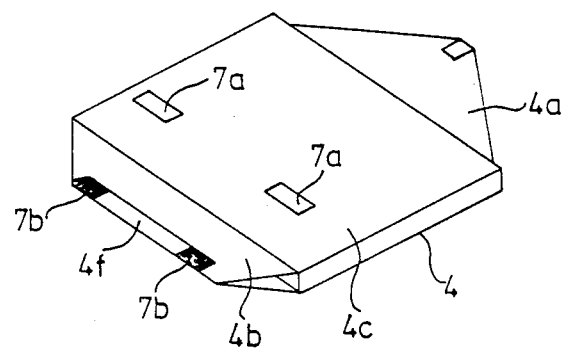
FIGS. 9 and 11, are perspective views of several positions of another embodiment of a film pack covering in accordance with the present invention.
Figure 10:
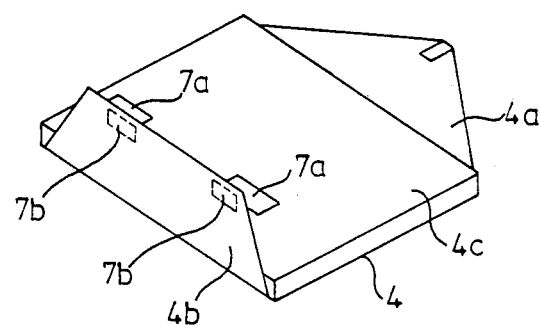
Figure 11:
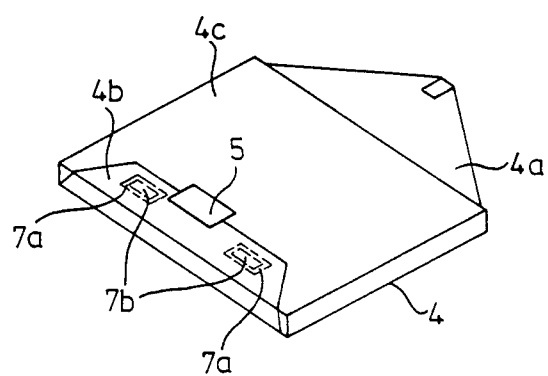

It can be seen from FIG. 4 that an insertion pocket 4e or loop are arranged also on the flat side which is opposite to the flat side 4c. The winding flap 4a is inserted in it for transportation or for storage of the film pack so that in non-use it does not loosely hang over the film pack.

FIGS. 5-11 show another embodiment of the present invention. It is also avoided here that during pulling the covering 4 from the stack 1 in the closed magazine 2, the securing for the closure flap 4b must be broken. Instead of the pocket 4d duct band strips 7a and 7b are provided in the flat side 4c. Here the open end of the closure flap 4b is not secured by the pocket 4d against light penetration and therefore the open end side of the closure flap must be folded at least once on the edge 4f. In correspondence with this, the burdock bent parts 7b must be arranged so that they extend at the position shown in FIGS. 10-11 on the burdock band parts 7a. Also, these burdock band connections 7a, 7b can be opened easier than tearing off an adhesive strip. This package is secured for transportation or before use with a tear-resistance burdock band 5 from unintentional opening.

Both embodiments have the additional advantage in that the opening 4 when required can be opened in a dark chamber, individual sheet films can be withdrawn, and the covering can be again closed for insertion in a magazine.

It will be understood that each of the elements described above, or two or more together, may also find a useful application in other types of constructions differing from the types described above.

While the invention has been illustrated and described as embodied in a light-tight tearable covering for a stack of sheet films, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A light-tight, tearable covering for a stack of sheet films to be inserted into a supply magazine of a sheet film-loading device, with the supply magazine provided with a pulling device for removing the covering after closing the supply magazine, the covering having a flat side; a winding flap engageable by the pulling device; a closure flap releasably held on said flat side; and a flat recess-forming portion provided on said flat side and formed so that said closure flap in a wrapped condition is insertable into said recess-forming portion.

2. A covering as defined in claim 1, wherein said recess-forming portion is formed as a pocket.

3. A covering as defined in claim 1, wherein said recess-forming portion is formed as a loop.

4. A covering as defined in claim 1; and further comprising an additional adhesive strip which additionally connects said closure flap with said recess-forming portion and with said flat side in an adhesive manner, said adhesive strip being tearable by hand.

5. A covering as defined in claim 1; and further comprising a further flat side which is opposite to said flat said serving for holding said closure flap; and a further recess-forming portion provided on said further flat side for inserting said winding flap.

6. A covering as defined in claim 5, wherein said further recess-forming portion is formed as a pocket.

7. A covering as defined in claim 5, wherein said further recess-forming portion is formed as a loop.

8. A light-tight, tearable covering for a stack of sheet films to be inserted into a supply magazine of a sheet film-loading device, with the supply magazine provided with a pulling device for removing the covering after closing the supply magazine, the covering having a flat side; a winding flap engageable by the pulling device; a closure flap releasably held on said flat side; and burdock band parts provided on said flat side and on a part of said closure flap which faces toward said flat part, said burdock band parts being engageable with one another.

9. A covering as defined in claim 8; and further comprising an adhesive strip connecting said closure flap with said burdock band parts in an adhesive manner, said adhesive strip being tearable by hand.

10. A covering as defined in claim 8; and further comprising a further flat side which is opposite to said flat said serving for holding said closure flap; and a further additional burdock band parts provided on said further flat side.

* * * * *